Figure 1:
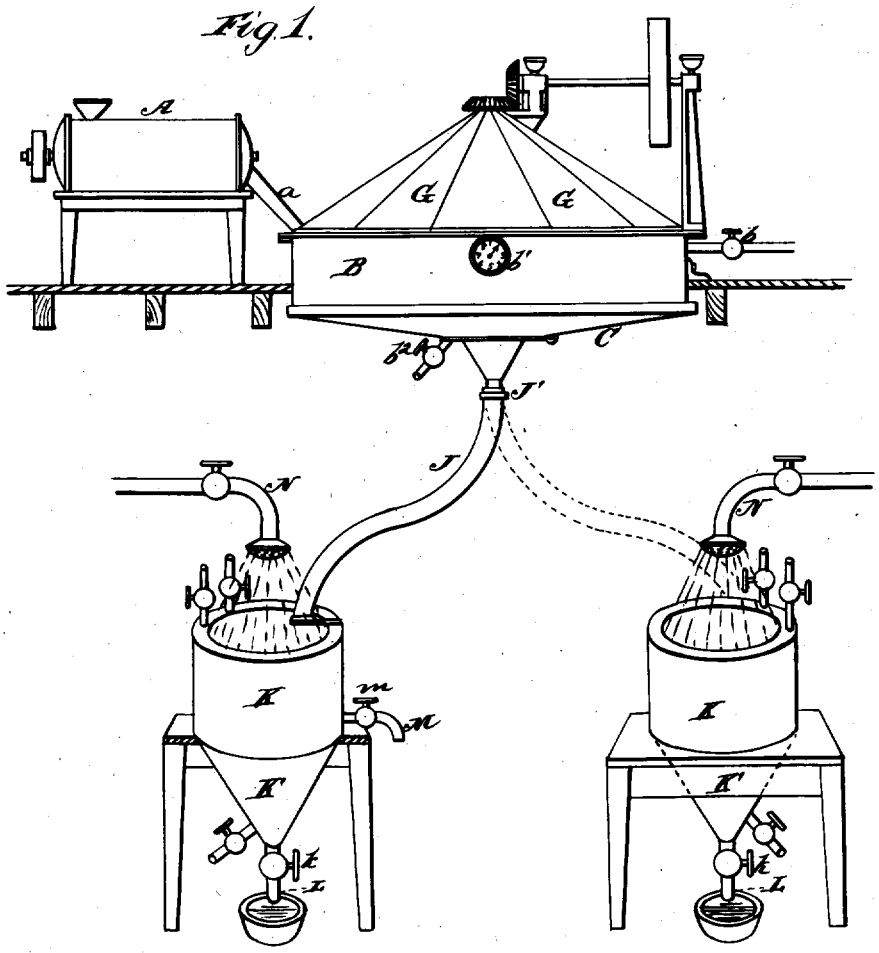

3 Sheets—Sheet 1.

W. E. ANDREW.

Process and Apparatus for Rendering Fats.

No. 9,254. Reissued June 15, 1880.

WITNESSES

Robert Everett

Geo. C. Fulton

INVENTOR

William E. Andrew.

By Helay Smith ATTORNEYS

3 Sheets—Sheet 2.

W. E. ANDREW.

Process and Apparatus for Rendering Fats.

No. 9,254. Reissued June 15, 1880.

WITNESSES

Robt Everett

Geo C. Fullton

INVENTOR

William E. Andrew

By H. Clay Smith ATTORNEYS

W. E. ANDREW.
Process and Apparatus for Rendering Fats.
No. 9,254. Reissued June 15, 1880.
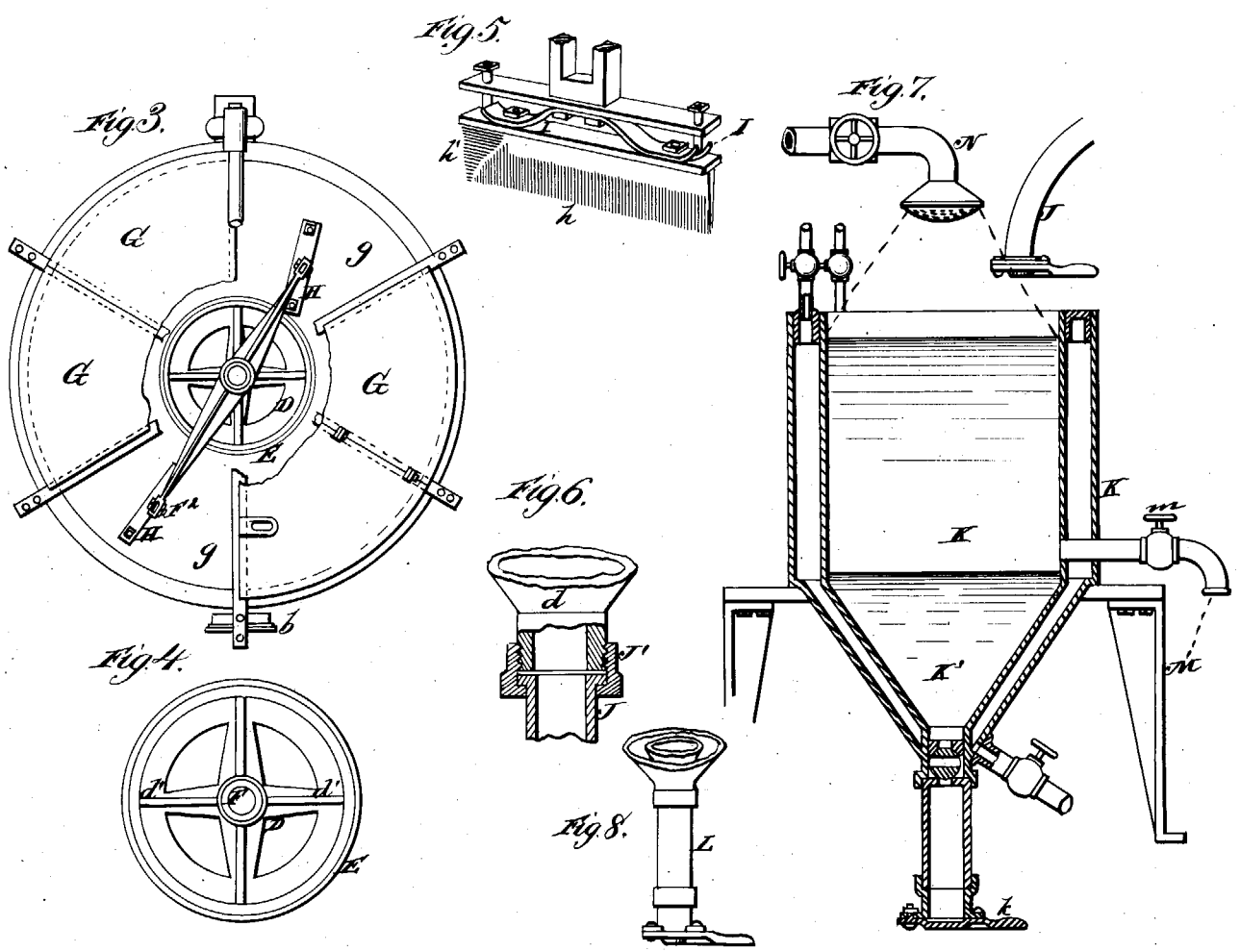
WITNESSES
Robert Everett
G. O. C. Fulton
INVENTOR
William E. Andrew.
By H. Clay Smith ATTORNEYS

UNITED STATES PATENT OFFICE.

WILLIAM E. ANDREW, OF JERSEY CITY, NEW JERSEY.

PROCESS AND APPARATUS FOR RENDERING FATS.

SPECIFICATION forming part of Reissued Letters Patent No. 9,254, dated June 15, 1880.

Original No. 189,541, dated April 10, 1877. Application for reissue filed April 14, 1880.

*To all whom it may concern:*

Be it known that I, WILLIAM E. ANDREW, of New York city, in the county of New York and State of New York, have invented certain new and useful Improvements in a Process and Apparatus for Rendering Fats; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The nature of my invention relates to a process and apparatus for hashing, rendering, and clarifying animal or other fats, to obtain a pure oil, to be used as an ingredient in the manufacture of artificial butter, and the object is to have the oil pure and odorless, and to have the entire operation a continuous process.

My invention consists—

First, in a rendering-vessel having an inclined plane upon which previously-hashed suet will fall, and the resulting oil be carried off automatically, as hereinafter set forth.

Second, in a combination of a hasher provided with worm, knives, hopper, and leader with a rendering-vessel having a strainer, whereby the hashed suet is fed automatically to the rendering-vessel, is rendered, strained, and the oil product conveyed away as fast as rendered.

Third, in an open-bottomed jacketed kettle, having inlets and outlets for steam and water to and from the chamber, formed by the walls thereof, having a cylindrical portion and an inclined portion, and having a perforated cylinder rigid with its bottom, so situated that it extends slightly over the heating-chamber. Vertically, from a distance of from fifteen inches to two feet, this vessel is cylindrical, and this portion has a steam-inlet and a steam-gage. From this portion the walls incline downward to an orifice in the center of the bottom in a direct plane, and both the vertical side and inclined bottom are surrounded by the heating-chamber.

Fourth, in a perforated cylinder extending from the bottom of the rendering-vessel upward, its diameter being slightly greater than that of the orifice in the bottom which it surrounds, being situated within the rendering-vessel, rigid with its bottom, and attached thereto at a point which is over the heating-chamber.

Fifth, in a steel or other proper brush or sweep adapted to prevent the accumulation of non-conducting substances upon the heating-surfaces, or to remove the same if accumulated. This provision not only allows a steady and continued rendering heat, but allows the ready separation of the melted fat, and also acts to agitate the melting fat.

Sixth, in the combination, with a rendering-tank, of revolving metallic brushes having both vertical and horizontal teeth, whereby both the outer surface of the perforated cylinder and the inner and lower surface of the tank are simultaneously swept.

Seventh, in having the metal brushes hung differentially on the shaft, so that one or more will sweep close to the perforated cylinder, and by its angle tend to throw the membrane outward, and one or more will sweep near the outer surface of the rendering-chamber, and by its angle tend to throw the same back into the mass. The rigid arm upon which these brushes are hung is so constructed that the brush which sweeps the outer surface is upon the longer projection.

Eighth, in a process for rendering animal fats by direct application to heated surfaces, and of automatically and continuously allowing the rendered fat to gravitate therefrom as fast as rendered.

Ninth, in a process of dry-rendering animal fat at a high heat and continuously conveying the fatty matter away as fast as rendered.

Tenth, in a process of rendering animal fat at a high temperature in contradistinction to rendering at a low temperature, and thereby obtaining a product devoid of disagreeable odor or taste.

Eleventh, in the connected and continuous process of hashing, melting, agitating, and removing.

In carrying out my invention, I provide a clarifying-vessel consisting of a cylindrical portion and an inverted conical portion, the whole being provided with inlets and outlets for water and steam, and also provided with a stop-cock at the outlet at the bottom of the inverted conical portion. This cylindrical portion and inverted conical portion are entirely surrounded by the heating-chamber.

I provide an oil-outlet at the base of the cylindrical portion of the clarifying-vessel, which makes a steam-tight joint through the heating-chamber.

To obtain an odorless oil for various purposes I select the finest of beeves' fat when it is fresh. I place it in a meat-hasher arranged above the rendering apparatus, and as fast as the fat becomes hashed sufficiently fine it is automatically led into the rendering-vessel, where it is subjected to a high temperature, rendered, agitated, strained, conveyed away, clarified, the impurities removed, and the clear pure oil obtained, the whole being one continuous complete automatic process.

It has heretofore been claimed that a pure oil, free from animal odor or taste, rendered from animal fat, could only be obtained when the rendering was done at a low temperature, say less than 125° Fahrenheit, which is about the natural temperature at which fat will melt.

Observation and experience have convinced me that when fat is rendered at such low temperatures the time necessary to separate the oil from the membrane or animal tissue is much greater, and the oil being in contact with such membrane, tissue, albumen, &c., so much longer than in quick rendering at high temperatures, the oil becomes impregnated with the animal odor and taste which are found in ordinary tallow, arising from the consequent animal decomposition. I avoid this by quickly rendering and conveying the melted fat away from the heat-giving surfaces and from the animal tissue in contradistinction to slow rendering and allowing it to remain in contact therewith a longer period of time.

I have constructed and arranged my apparatus and adopted a process by means of which I can obtain a pure, sweet, and odorless oil rendered from animal fat at high temperatures, my method being to obtain the rendered oil from the animal fat as fast as possible—*i. e.*, I hash the fat and quickly render it, clarify it, and the product is devoid of disagreeable odor or taste.

My apparatus consists, substantially, in a meat-hasher, a leader therefrom, a rendering-vessel, a conveyer therefrom, and a clarifying-vessel with outlets therefrom, all arranged in the succession named, the leader connecting the hasher and rendering-vessel, and the conveyer acting between the latter and the clarifying-vessel.

I construct my rendering apparatus of about six to seven feet in diameter, the cylindrical portion being about eighteen inches high, and I adapt it to stand a steam-pressure of from seventy to one hundred pounds to the square inch.

The high temperature which I use in my process is obtained from steam or superheated steam admitted into the jacket. The superheated steam is obtained by passing steam through a coil of pipe into the jacket of the rendering-kettle, the coil being inclosed in a highly-heated furnace situated near the rendering-kettle, and when the pyrometer or thermometer attached to the kettle indicates a heat at or about 300° Fahrenheit, which is about the temperature of the space between the jackets, I commence the operation of hashing, and the fat is at once led into the rendering-kettle, where it immediately melts, and the oil passes out through the conveyer into the clarifying-vessel, showing a temperature as it runs off from about 175° to 220° Fahrenheit, and it is not so susceptible to the action of decomposition or chemical change, such as souring or turning rancid, as is the case with all oils rendered at low temperatures, (say at or below 125° Fahrenheit,) they not being sufficiently cooked to sustain the varied atmospheric changes.

To obviate these objectionable features in the rendering of fats, as above mentioned, I have adopted the process and invented the apparatus for rendering such fats at high temperatures, for the purpose of thoroughly and quickly cooking the oil and immediately conveying it away from blood, membrane, and other animal matter, thus necessarily achieving the desirable result of obtaining an oil pure, sweet, and odorless, which is capable of transportation to any climate without undergoing any appreciable change.

Figure 2:
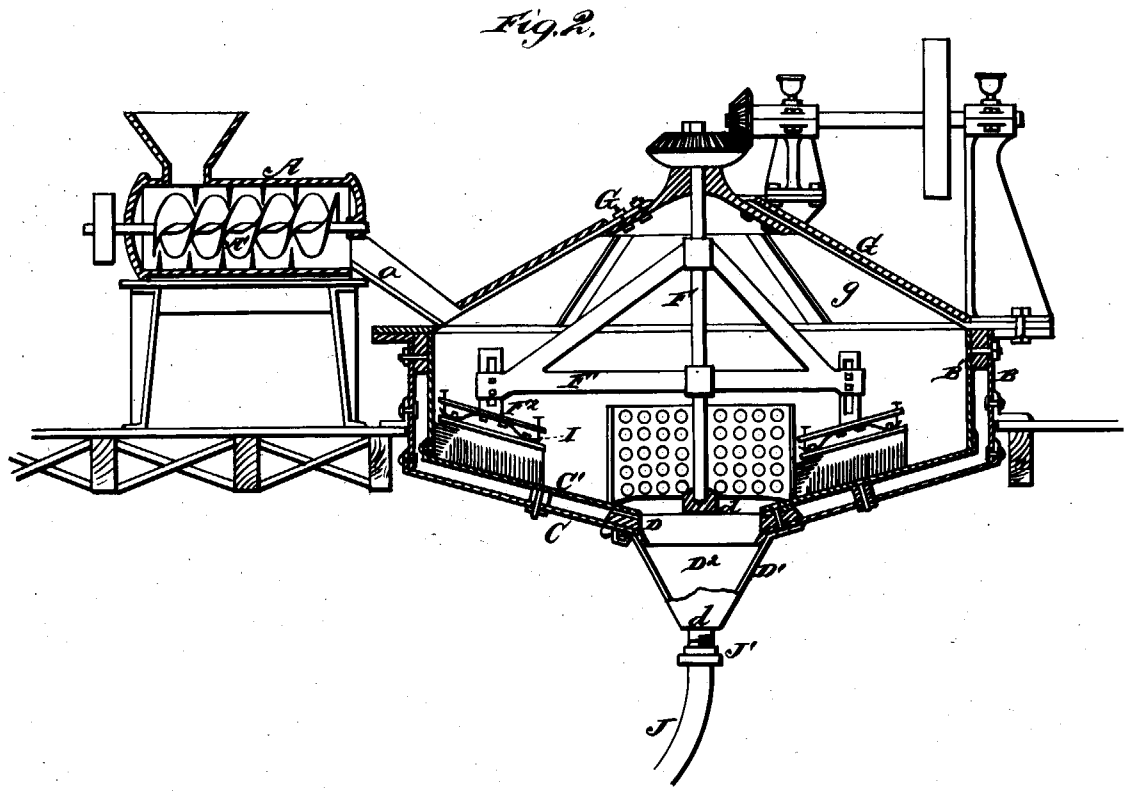

In the accompanying drawings, Figure 1 is a side elevation of the apparatus complete; Fig. 2, a part-sectional elevation of the hasher and renderer; Fig. 3, a top or plan view of the rendering-vessel, in part section, to show the brushes in position when in operation; Fig. 4, a plan view of the open bottom and framing which forms bearings for shaft; Fig. 5, a perspective view of the metallic brushes; Fig. 6, a sectional view of the swiveling joint of the conveyer; Fig. 7, a vertical sectional view of the clarifier and its auxiliaries; and Fig. 8, an elevation of the lower portion of clarifier, showing glass tube.

Referring to the drawings, A A′ represent the meat-hasher, provided with knives and worm upon a shaft operated by a pulley.

*a* represents the leader, which conveys the hashed suet to the rendering-vessel.

B B′ represent the cylindrical portion of the rendering-vessel, and C C′ the inclined portion beneath. Between the walls B C and the walls B′ C′ is a heating-chamber provided with steam-inlet *b* and outlet $b^2$. *b′* represents a steam-gage. From the outer periphery of the vessel to the orifice in the bottom the portions C C′ are in a direct plane.

D represents the orifice in the bottom; D′, the hinged falling bottom; $D^2$, the receiving-chamber therein; *d′*, the framing across the orifice D, and *d* the outlet to the conveyer.

E is the perforated cylinder, rigid with the bottom of the rendering-vessel, and surrounding the orifice D, upon which a perforated cap may be placed if deemed necessary.

F is the vertical revolving shaft, journaled above in the cover and below in the framing *d'*. F' is the rigid arm, upon which are hung arms $F^2$, which furnish bearings for the brushes.

G is the cover to the rendering-vessel, to confine the heat. It furnishes bearings for the revolving shaft, and is provided with suitable man-holes *g*, adapted to be opened or closed at will.

H is the metal brush, with yielding teeth *h h'*. These brushes are hung upon suitable framing, which revolves with the shaft F. One of these brushes sweeps near the perforated cylinder, operating upon both the bottom of the rendering-vessel and the outer surface of the perforated cylinder E. The other brush sweeps near the outer surface of the rendering-vessel and operates upon the bottom and sides thereof.

I is a spring, which is situated between the brush and its bearings, to allow of more free and universal movement.

The inner brush is hung upon its bearing so that the inner portion is in front, and the tendency therefrom is to throw the membrane outward, as well as to clean the perforated cylinder. The other brush is at an angle in opposite direction, and has an opposite effect.

J represents the conveying-pipe from the rendering-vessel to the clarifying-vessel, and J' the swivel-joint, which allows the same to be turned at will.

K K are the cylindrical walls of the clarifying-vessel, and K' K' the inclined walls of the same. Between these walls is a heating-chamber provided with suitable inlets and outlets for steam and water. *k* is a cock at the lower end of the clarifying-vessel.

L represents the glass tube at the lower portion of the clarifying-vessel, above which a cock may be placed.

M is an outlet for the oil at the base of the cylindrical portion of the clarifying-vessel, and *m* its controlling-cock.

N is the rose through which the water is injected into the clarifying-vessel. Any equivalent device which will atomize the water, and any chemically-prepared water of sufficient gravity, may be used without departing from the gist of my invention.

Through the glass tube L are discerned the blood, membrane, and other impurities which have been precipitated with the water from the rose N. The impurities are drawn off through the cock *k* until the pure clarified oil appears.

Two or more clarifying-vessels may be used.

This invention is an improvement on other patents granted to me for similar purposes in the United States.

I do not confine myself to any particular size in the construction of my apparatus so long as the hashed suet falls upon inclined rendering-surfaces which will allow the ready or automatic separation of the melted fat. Any reasonable temperature above 175° Fahrenheit will accomplish the desired results by my process and apparatus.

What I claim is—

1. A rendering-vessel having an inclined plane, upon which previously-hashed animal fat is melted by direct contact with heat, and the melted fat as rendered is removed continuously, as specified.

2. The combination of the meat-hasher A A' *a* with a rendering-vessel having a heat-radiating surface, B' C', and a perforated cylinder, E, rigid therewith, as specified.

3. The combination of a jacketed rendering-vessel, B B' C C', having an orifice, D, with a perforated cylinder, E, rigid with the vessel and surrounding the orifice, and extending slightly upon the heating-surface, as herein specified.

4. The perforated cylinder E, in combination with, and rigidly attached to, the bottom of an open-bottomed rendering-kettle, as specified.

5. The combination, with a rendering-vessel, as described, of a steel or other proper brush or sweep, as and for the purposes herein set forth.

6. The vertical shaft F, in combination with metallic brushes H, having vertical and horizontal teeth, in combination with the rendering-tank and perforated cylinder, as specified.

7. The brushes H, hung differentially, in combination with the operating means F F', the rendering-vessel, and the perforation-outlet, as herein set forth.

8. The process of rendering animal fats by heat of a high temperature derived from inclined metal surfaces and continuously, and by reason of gravity separating the liquid fat, substantially as herein specified.

9. The process of dry-rendering animal fats by subjecting the fatty matter to a high heat and conveying the fatty matter away as fast as melted, substantially as specified.

10. The process of producing melted animal fat odorless and tasteless, consisting in dry-rendering at a high temperature, conveying the same away as fast as melted, and subsequently cooling the same, the whole substantially as specified.

11. The connected and continuous process of hashing, agitating, and melting animal fats, and of removing the rendered oil therefrom, as herein specified.

In testimony that I claim the above I have hereunto subscribed my name in the presence of two witnesses.

WILLIAM E. ANDREW.

Attest:
H. CLAY SMITH,
F. W. RITTER, Jr.